Patented Apr. 30, 1940

2,198,628

UNITED STATES PATENT OFFICE 2,198,628

FULLY ACETYLATED SUGAR ACID CHLORIDES AND PROCESS FOR THEIR PRODUCTION

Randolph T. Major, Plainfield, N. J., and Elmer W. Cook, New York, N. Y., assignors to Merck & Co. Inc., Rahway, N. J., a corporation of New Jersey No Drawing. Application December 23, 1936, Serial No. 117,336

6 Claims. (Cl. 260—488)

This invention relates to acetylated 2-keto-sugar acids, and certain derivatives thereof, and to processes for their production.

The 2-keto-sugar acids have recently acquired considerable interest in view of the fact that the enol forms of the lactones from these acids have been shown to be vitamin C and its homologs. (Hirst, Chemistry & Industry, 1933, p. 221, and Haworth, Chemistry & Industry, 1933, 482.)

We have discovered a new method of preparing the acetyl derivatives of these acids, which involves the use of fully acetylated sugar acids as starting materials. These latter have been prepared by us for the first time, and are embraced in a patent application being filed concurrently herewith.

According to our improved process, the selected fully acetylated sugar acid is first converted to its acyl chloride. This latter is converted into the corresponding nitrile, from which the corresponding 2-keto acid may be obtained by hydrolysis. The acid thus obtained may be easily esterified.

We are attempting to hydrolyze the acetyl groups and enolize the keto group of pentaacetyl-2-keto-glucoheptonic acid and its ester to give a homolog of vitamin C.

In the following examples, we are illustrating the steps of our process as applied specifically to pentaacetyl-d-gluconic acid and tetraacetyl-d,1-xylonic acid:

FULLY ACETYLATED SUGAR ACID CHLORIDES

The dry fully acetylated sugar acid is added with cooling to a suspension of one molecular equivalent of phosphorus pentachloride in ten times its weight of dry ether. The reaction is soon completed, as shown by the disappearance of the phosphorous pentachloride.

Pentaacetyl-d-gluconyl chloride

After the solution has stood at room temperature for 2 or 3 hours, the ether is evaporated in vacuo. Dry xylene is then added. This and the phosphorus oxychloride formed in the reaction are removed by evaporation at 45 to 50°, in vacuo. The addition of xylene, followed by evaporation in vacuo, is repeated twice. The residual gum is dissolved in dry ether. Upon evaporation in a slight vacuum, beautiful white crystals separate. They have a melting point of 68–70°, and $$(\alpha)_D^{20} + 2°$$

(dry chloroform, c, 2).

With water, the acid chloride gives pentaacetyl-d-gluconic acid monohydrate.

Tetraacetyl-d,1-xylonyl chloride

White crystals appear soon after solution of the phosphorus pentachloride. The precipitate is recrystallized from dry ether. The product has a melting point of 90–92°, and $$(\alpha)_D^{20} 0°$$

(dry chloroform, c, 2).

FULLY ACETYLATED 2-KETO SUGAR ACID NITRILES

Pentaacetyl-2-keto-d-glucoheptonitrile

About 10 gms. of pentaacetylgluconyl chloride are heated for one hour with 4.7 gms. of silver cyanide in a closed tube at 120–125° C. The fused contents are frequently shaken to insure good contact of the acid chloride with the silver cyanide. After cooling, the gummy material is thoroughly extracted with anhydrous ether and filtered from the silver salts. Petroleum ether is added carefully to precipitate a part of the product as a dark colored syrup, thereby removing most of the color. Then an excess of petroleum ether is added with cooling. A gum is precipitated along with some crystalline product. The supernatant liquor is poured off and on evaporation yields crystalline pentaacetyl-2-keto-d-glucoheptonitrile. The gum is dissolved in a small quantity of absolute alcohol and upon standing in an ice box for 24 hours yields a quantity of pentaacetyl-2-keto-glucoheptonitrile. The product is purified by recrystallizing it from absolute alcohol. It has a melting point of 116°, and $$(\alpha)_D^{20} = +7°$$

(dry chloroform, c, 2).

When this compound is heated in water with either dilute acid or a base, hydrogen cyanide is evolved.

Tetraacetyl-2-keto-d,1-gulononitrile

This nitrile is prepared in the same way as pentaacetyl-2-keto-d-glucoheptonitrile, except that the filtrate obtained after the addition of sufficient petroleum ether to the ether extract to produce slight turbidity, is treated with another larger portion of petroleum ether which precipitates a gum. Trituration of this gum with absolute alcohol yields a solid precipitate. It is recrystallized from alcohol, and has a melting point of 125–126°.

Fully Acetylated 2-Keto Sugar Acids

Pentaacetyl-2-keto-d-glucoheptonic acid

About 7.55 gms. of pentaacetyl-2-keto-d-glucoheptonitrile are dissolved in 20 cc. of pure dioxane. To this, about 13.1 cc. of 1.39 n hydrogen chloride in dioxane is added. The solution is cooled and 0.33 cc. of water is added. The solution is allowed to stand for another 24 hours, by which time ammonium chloride precipitates. Ether is added and the ammonium chloride filtered. The filtrate is evaporated in vacuo to a gum. The gum is dissolved in ether and evaporation in vacuo is repeated. The remaining gum crystallizes on scratching. It has a melting point of 136–138°. After recrystallization from water it melts at 160–161°, $$(\alpha)_D^{20} 0°$$

(alcohol c, 2). A solution of the keto acid in water is acid to Congo red paper. It is extremely soluble in alcohol, ether, chloroform, and acetone.

Esters of Fully Acetylated 2-Keto Sugar Acids

Ethyl pentaacetyl-2-keto-d-glucoheptonate

A solution of 1 gm. of pentaacetyl-2-keto-d-glucoheptonic acid in 10 cc. of absolute alcohol containing 2% hydrogen chloride is warmed at 55°–60° for 5 minutes. The solution is quickly cooled to nearly room temperature and then allowed to crystallize. It has a melting point of 97–98°;

$$(\alpha)_D^{20} = 0°$$

(alcohol; c,2).

Methyl tetraacetyl-2-keto-d-gluconate

About 1 gram of methyl-2-keto-d-gluconate is added to 5 cc. of acetic anhydride containing 0.4 gm. of zinc chloride at 0°. As soon as solution is complete (about 30 minutes) the mixture is allowed to come to room temperature and remain there for 24 hours. It is then poured into 25 cc. of ice water. A white solid separates. It is recrystallized from absolute alcohol and has a melting point of 168–169° and $$(\alpha)_D^{20} = -133°$$

(chloroform; c,2).

From the foregoing description of the detailed steps of our new process, it will be apparent to those skilled in the art that tetraacetyl-2-keto-gulononitrile can be similarly hydrolyzed to the corresponding tetraacetyl-2-keto-gulonic acid and that this may be subsequently esterified, all in accordance with the steps described for the production of the corresponding 2-keto-glucoheptonic acid and its derivatives.

We claim as our invention:
1. Fully acetylated sugar acid chlorides.
2. Pentaacetyl-d-gluconyl chloride.
3. Tetraacetyl-d,1-xylonyl chloride.
4. Process for the production of tetraacetyl-d,1-xylonyl chloride which comprises treating dry tetraacetyl-d,1-xylonic acid with phosphorus pentachloride.
5. In a process for the production of acetylated 2-keto-sugar acids from fully acetylated sugar acids, the step which comprises producing the corresponding acid chlorides by reacting upon the appropriate fully acetylated sugar acid with phosphorus pentachloride.
6. Process for the production of pentaacetyl-d-gluconyl chloride which comprises reacting pentaacetyl-d-gluconic acid with phosphorus pentachloride.

RANDOLPH T. MAJOR.
ELMER W. COOK.